No. 886,649. PATENTED MAY 5, 1908.
C. B. SCHOENMEHL.
BATTERY COVER AND ELEMENT SUPPORT.
APPLICATION FILED MAY 29, 1905.
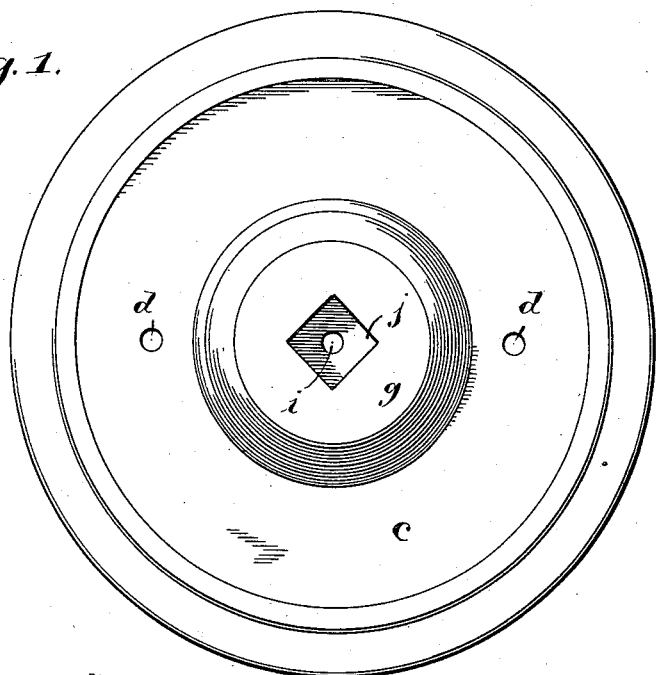
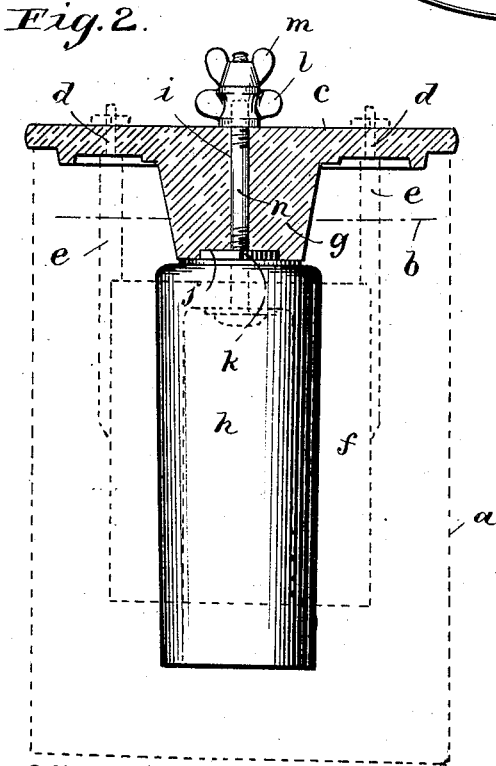
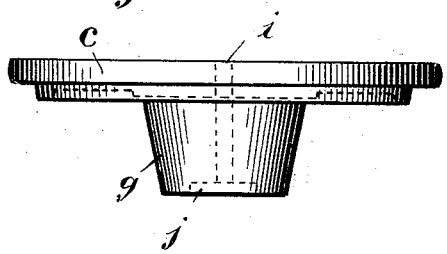
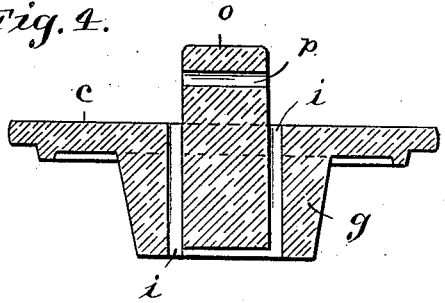
Witnesses
Ruth Raymond
Edward K. Nicholson
Inventor
Charles B. Schoenmehl
By
Chamberlain & Newman
Attorneys

UNITED STATES PATENT OFFICE.

CHARLES B. SCHOENMEHL, OF WATERBURY, CONNECTICUT.

BATTERY COVER AND ELEMENT SUPPORT.

No. 886,649.

Specification of Letters Patent.

Patented May 5, 1908.

Application filed May 29, 1905. Serial No. 262,952.

*To all whom it may concern:*

Be it known that I, CHARLES B. SCHOENMEHL, a citizen of the United States, and resident of Waterbury, in the county of New Haven and State of Connecticut, have invented certain new and useful Improvements in Battery Covers and Element Supports, of which the following is a specification.

This invention relates to new and useful improvements in battery bridges or covers, designed to support both the positive and negative element of a battery.

In practice I have found that in some forms of batteries containing an oil covered solution, a metallic deposit will form on the surface of the oil, with the working of the battery and the decomposition of the elements, and that such metallic covering is frequently sufficient to form a conductor intermediate of the elements, and to short circuit the battery. I also find that it is particularly desirable to provide a support for the central or negative element that will rigidly retain the same positively in the middle of the zinc, so as to prevent them contacting or decomposing unevenly.

The purpose of my invention therefore, is to provide a cover or bridge which can preferably be made of porcelain, and have an integral extension formed thereon for the attachment of one of the battery elements, which extension will be sufficiently long to retain its element below the normal solution line of the battery; to construct the extension of a material and in a manner to protect the supporting rod of the element from attack by the surface sediment that may form on top of the solution, contained within the jar; and to provide an extension which in design shall be proper to form a firm engagement for the element and its supporting rod so as to insure a rigid connection of the two.

Upon the accompanying drawings forming a part of this specification similar letters of reference denote like or corresponding parts throughout the several figures and of which, Figure 1, shows an inverted plan view of a battery cover including my improved insulating extension. Fig. 2, shows a central vertical cross - section through the cover shown in Fig. 1, and illustrating by full lines a compressed copper oxid element attached, and by dotted lines, a cylindrical zinc, and Fig. 3 shows a side elevation of the cover illustrated in the preceding figures. Fig. 4, is a further vertical cross section through a cover containing an extension having two holes therethrough for the attachment of an element.

Referring in detail to the characters of reference marked upon the drawings $a$ represents a jar shown in dotted lines, and $b$ the top or surface line of solution therein.

$c$ indicates a cover which may be of any preferred general design and likewise of any suitable insulating material, as for instance porcelain. This cover may contain a shouldered ledge for the engagement of the top of a battery jar, and further is provided with holes $d$ for the reception of the supporting rods $e—e$ of the positive or zinc element $f$, shown in dotted lines.

The depending insulating extension $g$ of the cover, for the negative element $h$ is formed integral and of the same material as the cover, and is situated central of the underside of the cover and is preferably of a tapering cylindrical or oblong form, with one or more holes $i$ therethrough and a shouldered recess $j$ at the lower end of said hole or holes. These holes extend through both the extension and cover, and serve to receive the attaching or supporting rod $n$ of the negative element $h$, while the shouldered enlargement $j$ serves to receive the nut $k$ that clamps the compressed oxid of copper element to its supporting rod. This nut when seated in the recess serves to hold the rod and element against turning when the wing and binding nuts $l$ and $m$ are being attached.

As clearly shown in Fig. 2, the depending projection $g$, extends well below the surface line $b$, of the solution and constitutes a protecting-lug for the attaching rod or supporting member $n$, of the element $h$, while its extended annular lower surface covers the top of the element.

The form of cover shown in Fig. 4, is provided with two holes $i$ which are arranged to pass through both the cover and extension and is designed to accommodate a slightly different style of element and support. This cover also contains a lug $o$ on the top having a transverse hole $p$ therethrough for the securement of the element rod.

Having thus described my invention, what I claim and desire to secure by Letters Patent is:—

1. A battery bridge, and a supporting member, said bridge having a depending conical supporting-member protecting-lug extending below the solution surface.

2. A battery bridge or cover having an integral depending extension having an annular lower surface to cover the end of a battery element, and having a pair of holes through said extension and cover, and a lug on the top side of the cover intermediate of said holes of the cover.

3. A battery cover having an integral conical insulating projection on the underside extended below the solution line, and having an extended lower surface to engage the top of a battery element, and having one or more holes through both said extension and cover to receive the element supporting rods.

4. A battery bridge or cover having an integral extension to cover the supporting rod and end of a battery element, and a shouldered pocket in said extension to hold the element and rod from turning.

Signed at Waterbury in the county of New Haven and State of Connecticut this 22nd day of April A. D., 1905.

CHARLES B. SCHOENMEHL.

Witnesses:
  C. M. NEWMAN,
  RUTH RAYMOND.